Sept. 15, 1964  A. E. CUTLER  3,149,195
RADAR OR ECHO TYPE SIMULATORS
Filed Feb. 3, 1961  5 Sheets-Sheet 2

INVENTOR
Albert Ernest Cutler
BY
Larson and Taylor
ATTORNEY

United States Patent Office 3,149,195
Patented Sept. 15, 1964

3,149,195
RADAR OR ECHO TYPE SIMULATORS
Albert Ernest Cutler, Barnet, England, assignor to Communications Patents Limited, London, England
Filed Feb. 3, 1961, Ser. No. 87,024
Claims priority, application Great Britain Feb. 12, 1960
7 Claims. (Cl. 35—10.4)

This invention relates to radar, sonar and audar training and simulating apparatus.

Radar, sonar and audar simulators of various kinds are known which produce a display on a cathode ray tube or produce a visual or audible indication to simulate the display or indication produced by objects which would reflect the signal pulses transmitted by the system simulated. In place of actual echo signals, such simulators generate corresponding signals by means of electronic circuits and electro-mechanical devices. In such simulators, it is usual to generate an echo by methods which involve computing the distance of a simulated reflecting object from a simulated aerial or transducer, that is computing the range of the simulated object, creating an electrical pulse at a time to represent the range of the simulated object and releasing the said pulse to the display or indicating system when the axes of response of the simulated aerial or transducer and the direction of the simulated object are substantially coincident.

An object of the present invention is to provide radar, sonar or audar simulating apparatus having improved means for generating electrical signals corresponding to the instantaneous range and bearing of a simulated object, for display on a radial scan, sector scan or other display or indicating device.

A further object of this invention is to provide radar, sonar and audar simulating apparatus having means whereby simulated radar echo signals can be produced without the use of electro-mechanical computing elements corresponding to or used in the computation of the range of each of the objects represented, in order to simplify and reduce the cost of such training and simulating equipment.

According to one aspect of the invention, radar, sonar or audar simulating apparatus includes computing means whereby the position of a simulated object responsive to radar, sonar or audar signals is represented in the form of co-ordinates referred to the axes of a simulated scanner or transponder.

According to another aspect of the invention, radar, sonar or audar simulating apparatus includes computing means supplied with an electrical voltage of repetitive waveform, from which are derived voltages representative of the range and the reciprocal of the range of the simulated object.

In order that the invention may readily be carried into effect, several embodiments of the invention will now be described, by way of example only, with reference to the accompanying drawings, which illustrate parts of an apparatus for simulating, in real time, echoes from one or more objects moving in relation to a ground radar search system using a rotating aerial. For the sake of simplicity it is assumed that the earth is flat and the moving objects, unless otherwise stated are moving at surface level. In the accompanying drawings.

Figure 1:
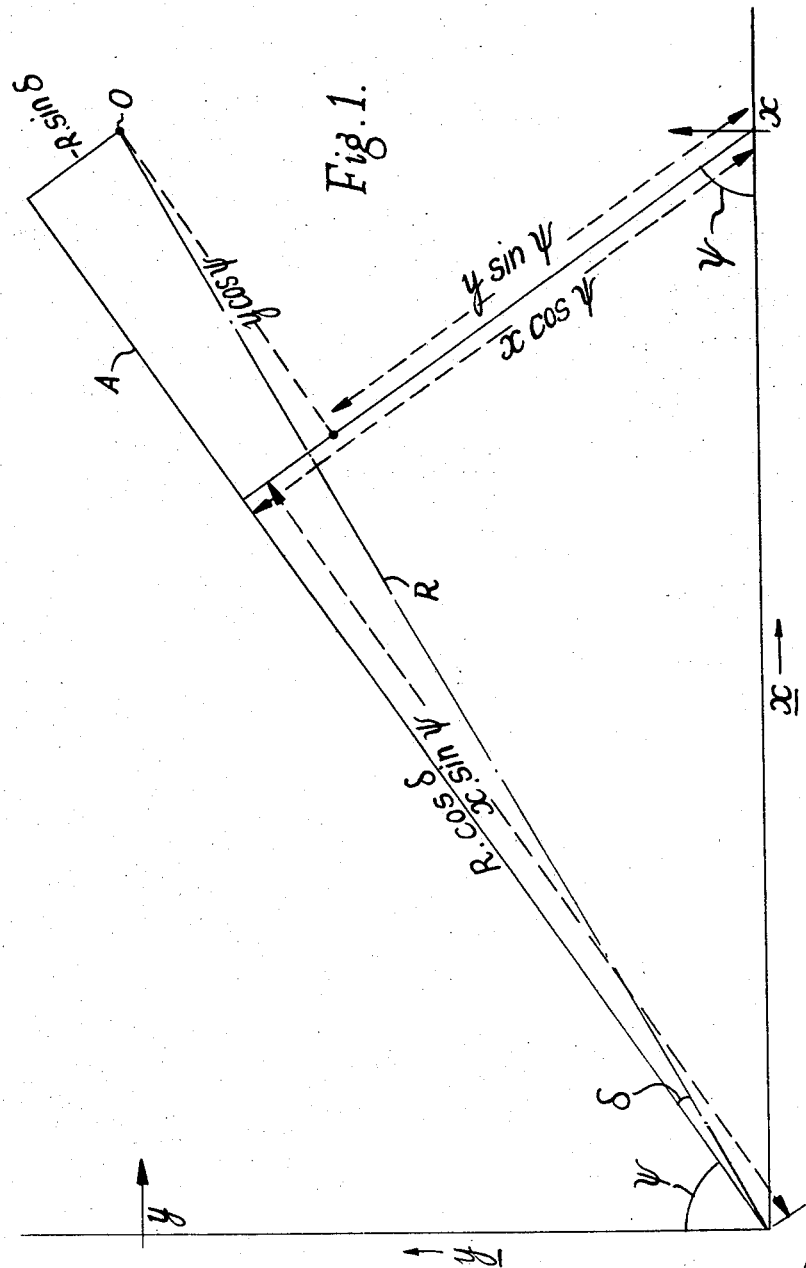
FIG. 1 illustrates the derivation of the equations relating the position of the object with respect to the axis of response of the aerial.

The method of producing echoes used in this embodiment is based on the evaluation of quantities representing the co-ordinates of a moving object referred to plan scanner axes. In FIG. 1, the object is shown in a position indicated by the reference O, the corresponding rectangular co-ordinates being $x$, $y$. The instantaneous angular position of the beam axis A of the radar scanner from the $y$ axis is given by $\psi$ and the angular misalignment of the object from the scanner axis is $\delta$. It will be seen that the co-ordinates of the object O related to the scanner axis A, instead of the axis $x$ and $y$, are:

$$X = x \cos \psi - y \sin \psi$$
$$Y = x \sin \psi + y \cos \psi$$

These, in terms of bearing misalignment $\delta$ and range R, are:

$$X = R \sin \delta$$
$$Y = R \cos \delta$$

Assuming $\cos \delta = 1$ and $\delta = \sin \delta$, a close approximation for small values of $\delta$, then:

$$R \simeq x \sin \psi + y \cos \psi$$

and $$\delta \simeq \frac{1}{R}(x \cos \psi - y \sin \psi)$$

In radar systems, the range of an object is determined from the time interval $t$ between the transmission of a pulse of high-frequency electro-magnetic energy, in the form of a group of waves, which travel at the velocity $c$, and the return to the point of transmission of a small portion of that energy by reflection from the object.

In this embodiment, the range and misalignment equations given above are evaluated, using $ct$ and $$\frac{1}{ct}$$

in place of R and $$\frac{1}{R}$$

respectively. The substitution is exactly justified at the instant of coincidence. The quantities represented by $ct$ and $$\frac{1}{ct}$$

are provided by repetitive waveforms generated in a master time-base unit.

To represent beamwidth, range pulses are required to be displayed when the misalignment angle is less than the semi-beamwidth of the aerial system. Using $$\frac{1}{ct}$$

instead of $$\frac{1}{R}$$

to evaluate the misalignment equation, gives rise to a change of beamwidth by the factor $$\frac{ct}{R}$$

but this can be neglected when $R \sin \delta$ is small and R is substantially equal to $ct$.

Figure 2:
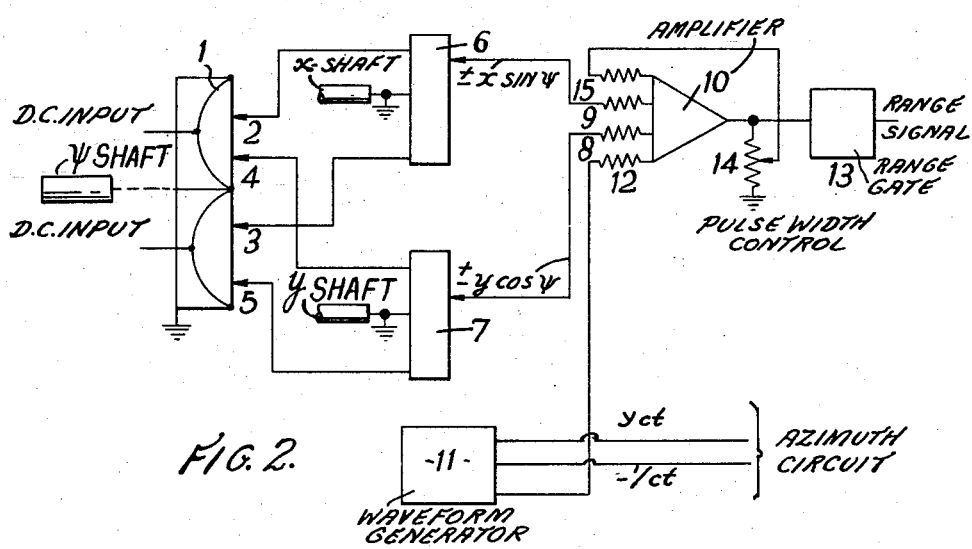
FIG. 2 is a block diagram showing the essential elements used for producing a pulse corresponding to range.

Referring to FIG. 2, the shaft of a sine/cosine potentiometer 1 is rotated by a servo unit represented by the shaft $\psi$ at a speed corresponding to the speed of rotation of the aerial of the simulated system. From wipers 2, 3, 4 and 5 of the potentiometer 1, there are derived voltages representing the functions $\sin \psi$, $-\sin \psi$, $\cos \psi$ and $-\cos \psi$, where $\psi$ is the angle of direction of the aerial with respect to a fixed reference at any instant of time.

In a separate computer, not shown in the drawings, the movement of each object to be represented is resolved into northing and easting components of velocity. These components of velocity are fed to pairs of co-ordinate integrators to provide shaft rotations representing the northing displacement and easting displacement of each simulated object from the radar aerial. The shafts of the integrators defining the position of one such object are shown as $x$ and $y$, in FIG. 2.

The shafts $x$ and $y$ of the integrators respectively drive the wipers of potentiometers 6 and 7. The windings of potentiometers 6 and 7 are connected, together with the windings of similar potentiometers driven by the shafts of the integrator pairs representing other simulated objects, to the wipers 2, 3, 4 and 5 of potentiometer 1.

In cases where a large number of objects is simulated, or where the number of objects may be changed during an exercise, it is desirable to interpose D.C. amplifiers between the wipers of potentiometer 1 and the windings of the potentiometers driven by the integrators, to avoid inaccuracies due to excessive or variable loading of potentiometer 1.

The outputs from the wipers of potentiometers 6, 7 are thus $\pm x \sin \psi$ and $\pm y \cos \psi$. These outputs are combined through summing resistors 8 and 9 of an amplifier 10, and together produce a function of sine form. One of the two maxima occurs when the object and aerial are in line. The voltage amplitude of this maximum represents the range.

This function is evaluated by comparing it with a repetitive sawtooth voltage of opposite polarity to the said range voltage connected via a summing resistor 12. The sawtooth voltage is obtained from a master time base unit 11. Each sawtooth voltage rises lineally with time, its amplitude, at any instant, representing the product $ct$ up to the maximum range of the system. The repetition rate is that of the radar set it is desired to simulate. At the point where the combined input voltage of the amplifier changes polarity, a range gate 13, the input of which is connected to the amplifier 10, is operated and a pulse is produced which is delayed relative to the initiation of the sawtooth by an amount which is proportional to the amplitude of the range voltage. A second pulse is produced during the flyback period of the sawtooth, but this is of no consequence as the display is suppressed during this period by a blanking pulse.

The range gate 13 is arranged to produce an output which rises to a maximum as the ramp waveform input passes through zero. The faster the rate of change of the input waveform, the narrower the width of the output pulse produced. Thus, by varying the gain of the amplifier 10, the pulse width may be adjusted to a value to correspond to the radar set which is being represented.

The gain of the amplifier 10 is adjusted to the desired value by means of a potentiometer 14, which provides voltage feedback via a resistor 15.

Figure 3:
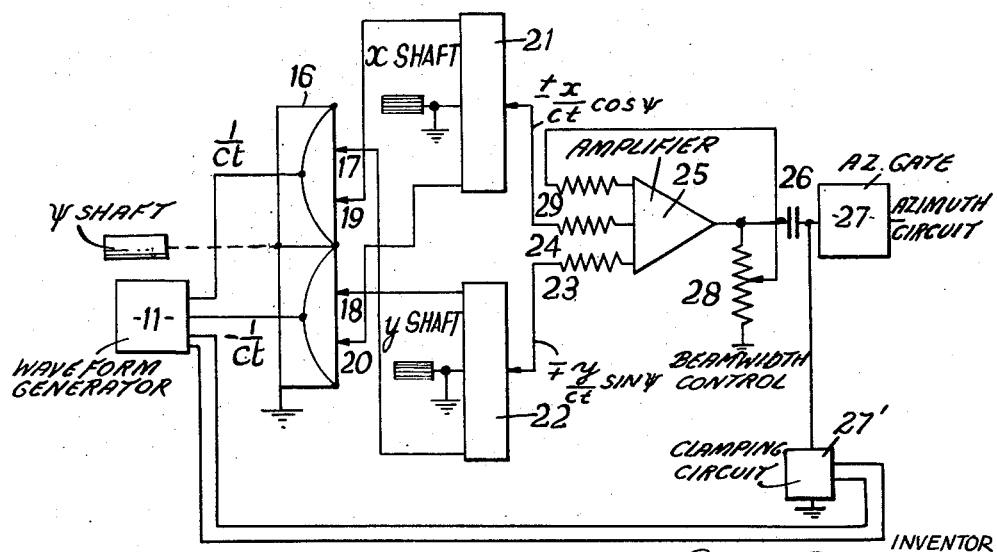
FIG. 3 is a block diagram showing the essential elements concerned with the provision of range pulses in correct azimuth.

Referring to FIG. 3, waveforms of the same period as the sawtooth waveform but representing the reciprocal time functions $$\frac{1}{ct}, \frac{-1}{ct}$$

are generated by the discharge of a multiple section C.R. network in the master time-base unit 11 and fed to the input points of a sine/cosine potentiometer 16. The potentiometer 16 is rotated by the aerial servo unit represented by the shaft $\psi$. From the wipers 17, 18, 19 and 20 of potentiometer 16, there are derived voltages representing the functions $$\frac{\sin \psi}{ct}, \frac{-\sin \psi}{ct}, \frac{\cos \psi}{ct}, \frac{-\cos \psi}{ct}$$

respectively. These voltages are supplied as indicated in FIG. 3, to the windings of potentiometers 21, 22 and similar pairs of potentiometers driven by integrator pairs representing other simulated objects.

As in the case of the range computing system, it is desirable to interpose D.C. amplifiers between the wipers of potentiometer 16 and the windings of the potentiometers driven by the other integrator pairs, if the loading on potentiometer 16 is likely to be varied or is excessive.

The shafts $x$ and $y$, of the integrators defining the position of the simulated object, already referred to in that part of the description dealing with the determination of range, are coupled to the potentiometers 21, 22. The outputs at the wipers are thus $$\frac{x}{ct} \cos \psi \text{ and } \frac{y}{ct} \sin \psi$$

These voltages are combined, via summing resistors 23 and 24 at the input of a D.C. amplifier 25, to represent $\sin \delta$ and hence to approximate the misalignment angle $\delta$.

The output of the amplifier 25 is capacitively coupled by a capacitor 26 to an azimuth gate 27. A clamping circuit 27', operated by pulses obtained from the waveform generator 11, is applied to the input of the gate 27 to make the potential at the end of each waveform excursion equal to zero. By this means, errors due to drift in the amplifier 25 are avoided. In the gate 27, it is arranged that a rise of output voltage occurs as the input becomes equal to zero, that is when $$\left(\frac{x}{ct} \cos \psi \frac{y}{ct} \sin \psi\right)$$

is substantially equal to zero. This represents the interval of time when the radar beam is directed towards the object and 180° away from the object. Similarly, an output is maintained if, for any reason, the object and aerial remain in line.

A short output pulse is produced near the end of every $$\frac{1}{ct}$$

cycle, but these pulses are of no consequence as they occur during periods when any responses caused thereby are suppressed at the display by the blanking pulse.

The gain of the amplifier 25 is varied by adjustment of a potentiometer 28, which provides voltage fedback via a resistor 29. In this way, the rate of change of the input voltage is varied to permit different beamwidths to be represented.

Figure 4:
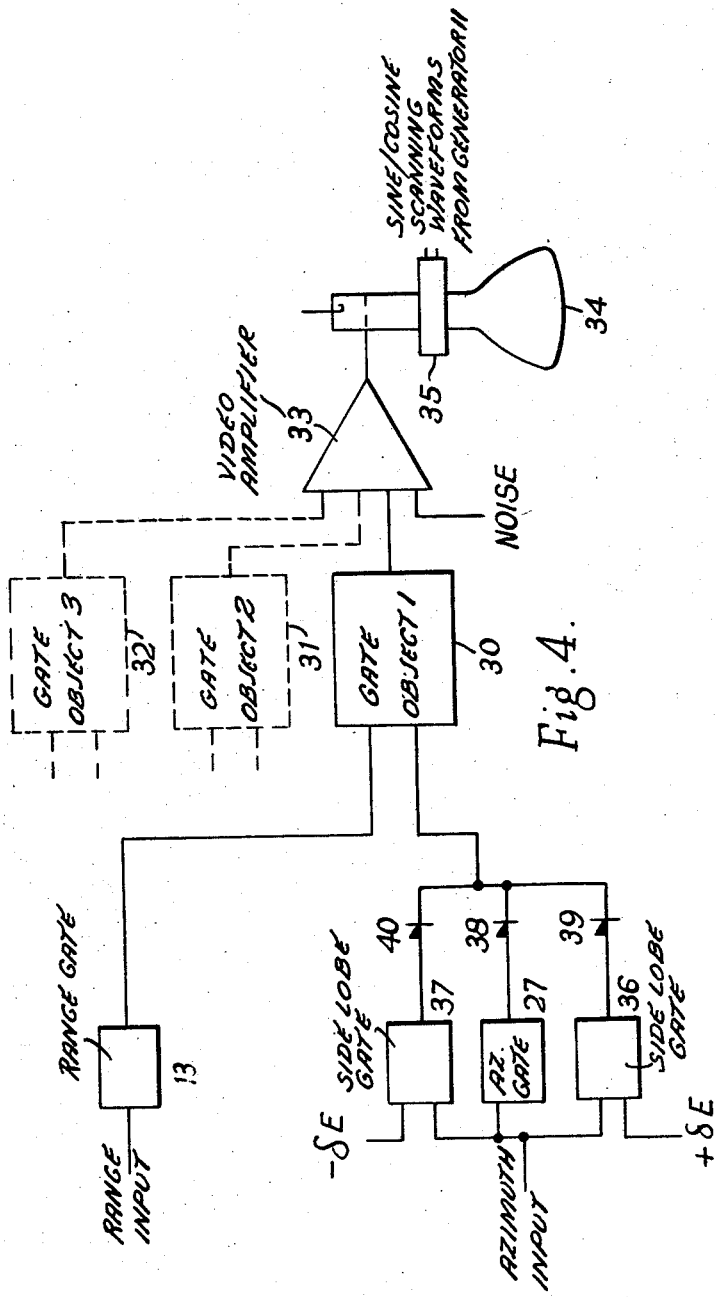
FIG. 4 is a block diagram of the essential elements concerned with the provision of a display to one trainee.

Referring to FIG. 4, a gate 30 receives at its input the pulses produced by the range gate 13 and the output of the azimuth gate 27. Whenever a voltage occurs simultaneously at the two inputs, that is in each range excursion when an object is within the aerial beamwidth, a pulse is produced by the gate 30. The pulse produced thereby, together with pulses from similar gates 31, 32 corresponding to other objects, and signals for simulating radar noise are fed to a video amplifier 33 and thence to the control electrode of a cathode ray display tube 34. The scanning system 35 of the tube 34 is fed in the usual way with sine/cosine components of a sawtooth waveform derived from the master waveform generator 11, via a magnetic resolver (not shown) mounted on the aerial servo using a clamp driver unit (not shown) to restore the D.C. level.

In cases where it is desired to simulate responses due to the presence of side lobes in the polar response characteristics of the simulated aerial system, additional gates are included for each lobe to be represented, in parallel with the main azimuth gate 27. These gates are biased with small positive and negative voltages so as to cause the side lobe gates to operate at positions removed a few degrees from that of the main lobe gate and to provide outputs of correct relative amplitude.

In FIG. 4, two such gates are shown at 36 and 37. These correspond to two side lobes, one biased by the voltage $+\delta E$ and the other by the voltage $-\delta E$, and are connected via elements 38, 39 and 40 to sum, substantially without loss, the three azimuth voltages at the common output.

As was stated earlier herein, the use of the values $ct$ and $$\frac{1}{ct}$$

in place of the values $R$ and $$\frac{1}{R}$$

respectively represents an accurate substitution at the instant of coincidence. With misalignment, up to half the beamwidth angle on each side of coincidence, the basic error in the system is defined as follows:

Let $t$ be defined by $ct = R \cos \delta$

If at this time a voltage proportional to the value $$\frac{R \sin \delta}{ct}$$

is fed to a gate circuit which closes when this voltage exceeds that equivalent to an angle $\delta_1$, the semi-beamwidth angle i.e. at the edge of the beam, $$\frac{R \sin \delta}{ct} = \delta_1$$

Using $\sin^2 \delta + \cos^2 \delta = 1$ $$\frac{\delta_1^2 c^2 t^2}{R^2} + \frac{c^2 t^2}{R^2} = 1$$

and $$R = ct \sqrt{1 + \delta_1^2}$$

The proportional error in using $ct$ for $R$, is therefore $$\frac{R - ct}{R}$$

$$= \left(1 - \frac{1}{\sqrt{1 + \delta_1^2}}\right)$$

$$\simeq \frac{\delta_1^2}{2}$$

Thus for a beamwidth of 10°, $$\delta_1 = \frac{5°}{57.3} \text{ radians}$$

and $$\frac{\delta_1^2}{2} \simeq 0.4\%$$

A minor defect in the system described, which may be noticeable when the horizontal beamwidth is large, say in excess of 10°, is a distortion of the shape of the responses displayed on the trainee's C.R.T.. The distortion takes the form of excessive curvature of the responses. This is brought about by using $R \cos \delta$ for $R$, the locus of $R \cos \delta$ being a pair of circles back to back, whose radii are half that of the true radius.

The defect may be corrected by means of an additional input to the amplifier 10 of the range computing system which is derived as follows by letting:

$$R \cos \delta \simeq R\left(1 - \frac{\delta^2}{2}\right)$$

then, $$R \simeq R \cos \delta + \frac{R \delta^2}{2}$$

or in terms of known quantities:

$$R \simeq (x \sin \psi + y \cos \psi)$$
$$+ \left(\frac{x \sin \psi + y \cos \psi}{2}\right)\left(\frac{x \cos \psi}{ct} - \frac{y \sin \psi^2}{ct}\right)$$

The additional computing elements needed for this purpose consist of an electronic squarer and an electronic multiplier and are of conventional design. The quantity $$\left(\frac{x \cos \psi}{ct} - \frac{y \sin \psi}{ct}\right)$$

is formed from the voltage outputs obtained from the wipers of the potentiometers 21, 22 and fed to the squarer. The squared output is in turn fed to one input of the multiplier for multiplication by $$\frac{x \sin \psi + y \cos \psi}{2}$$

which is the other input. This input is formed by the voltages obtained from the wipers of the potentiometers 6 and 7.

The apparatus described above with reference to FIGS. 1 to 4, has been successfully used in practical simulators having ratios of maximum to minimum range of up to 100:1.

An alternative method of generating a range pulse using a $$\frac{1}{ct}$$

waveform will now be described. This arrangement is convenient when it is not required to represent objects below 1%–2% of the maximum range. In this method, $$\frac{r \cos \delta}{ct} = 1$$

is computed by evaluating $$\frac{1}{ct}(x \sin \psi + y \cos \psi)$$

using a plate in which a pulse is produced at a present voltage level.

Figure 5:
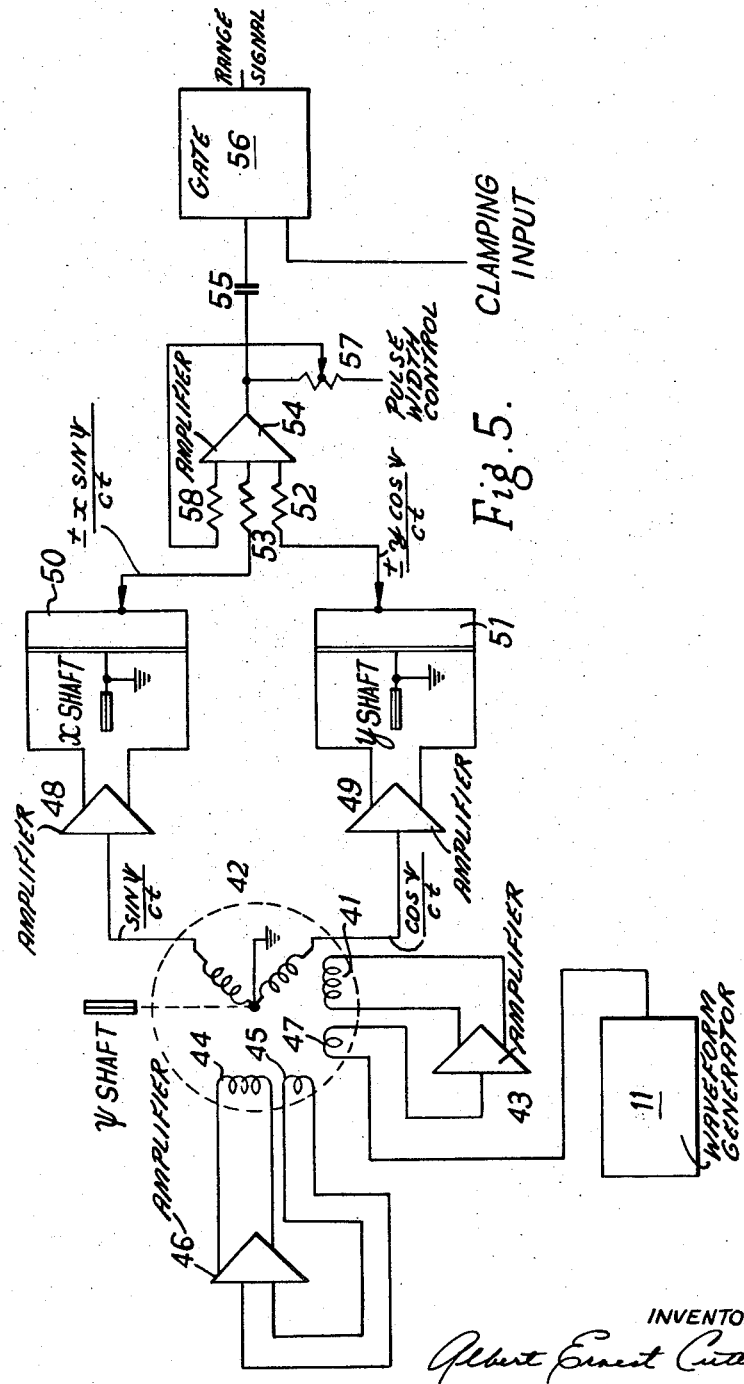
FIG. 5 is a block diagram showing an alternative method of producing a pulse corresponding to range.

Referring to FIG. 5, a waveform generated in the master waveform generator 11 is fed to one winding 41 of a magnetic resolver unit 42 via an amplifier 43 to provide at the two outputs of the resolver, the waveforms $$\frac{\cos \psi}{ct} \text{ and } \frac{\sin \psi}{ct}$$

when the resolver is driven by the aerial servo unit. The quadrature stator winding 44 of the resolver is self excited from an auxiliary stator winding 45 via an amplifier 46. Current will flow from the amplifier 46 to the winding 44 in order to maintain zero flux in the auxiliary winding 45. Any reaction due to load current or inequalities in the unit will be effectively neutralized. An auxiliary winding 47 is used to provide negative feed-back to the amplifier 43. The circuit arrangement thus provides the conditions of excitation requisite for precise operation with a variable input voltage in accordance with well-known methods for the operation of magnetic resolvers.

The outputs from the resolver rotor are fed to two inverter buffer amplifiers 48 and 49. The amplifier outputs are supplied to the windings of two potentiometers 50 and 51, which are carried by the co-ordinate integrators represented in FIG. 5 by the shafts $x$ and $y$ as in FIG. 3.

The outputs from the wipers of the potentiometers 50, 51 are summed via resistors 52, 53, at the input of an amplifier 54 to provide an output which is capacitively fed by a capacitor 55 to a gate 56. In this gate, which is similar to the azimuth gate 27, a clamping circuit is used to establish the D.C. level of the input waveform. The voltage level, in each cycle at which the range pulse is generated, is determined by biasing the input to correspond to the condition when $$\frac{R \cos \delta}{ct} = 1$$

The gain of the amplifier 54 is varied by adjustment of a potentiometer 57, which provides voltage feedback via a resistor 58. By this means, the rate of change of the input voltage is varied to permit different pulsewidths to be represented.

When the object to be simulated is airborne, it is sometimes necessary to represent the range of the object more accurately than is given by the method described above.

This is readily possible in simulators where the altitude of each object is provided, for example, by an integrator whose input is fed with a quantity representing the vertical velocity of the object and whose output shaft takes up an angular position corresponding to the altitude.

To about 20° elevation, the slant range $Rs$ of an object may be represented by the equation:

$$Rs = Rg\left(1 + \frac{h^2}{2R^2g}\right)$$

where $Rg$ is the ground range, and $h$ is the height, or approximately by:

$$Rs \simeq Rg + \frac{h^2}{2Rs}$$
$$\simeq Rg + \frac{h^2}{2ct}$$

This means that a useful approximation to the slant range of the object can be obtained by providing an additional input to the summing amplifier 10, in a circuit of the type shown in FIG. 2, a quantity which represents the $$\frac{h^2}{2ct}$$

term of the above expression.

This is conveniently achieved by feeding the $$\frac{1}{ct}$$

waveform from the master time-base unit, via a buffer amplifier, to a square law potentiometer on the altitude integrator of each object represented. The voltage from the wiper of this potentiometer, corresponding to $$\frac{h^2}{2ct}$$

and the outputs of the potentiometers carried by the $x$ and $y$ shafts of the co-ordinate integrators associated with the object are summed with the sawtooth voltage of opposite polarity so that the range gate is operated when the combined input to the amplifier changes sign.

D.C. amplifiers of modest design can be used in the range and azimuth circuits of FIG. 3 and FIG. 5, since long-term freedom from drift is not a requirement and highly stabilised power units are in consequence not needed to supply them.

It is also feasible to use a resolver in an azimuth computing circuit in place of a sin/cos potentiometer. This is desirable when an aerial servo is operated continuously at high speeds, since a potentiometer used under such conditions may introduce noise into its associated circuits or give trouble due to wear.

The advantages to be gained by the use of resolvers is brought out to the full when airborne interception systems are to be simulated, in which very fast scanning is used and a number of angles are variable. In such simulators, the target is referred to the scanner axes in the manner described, the range and misalignment angles in the two planes being computed in resolver chains fed with $$\frac{1}{ct}$$

repetitive functions.

Figure 6:
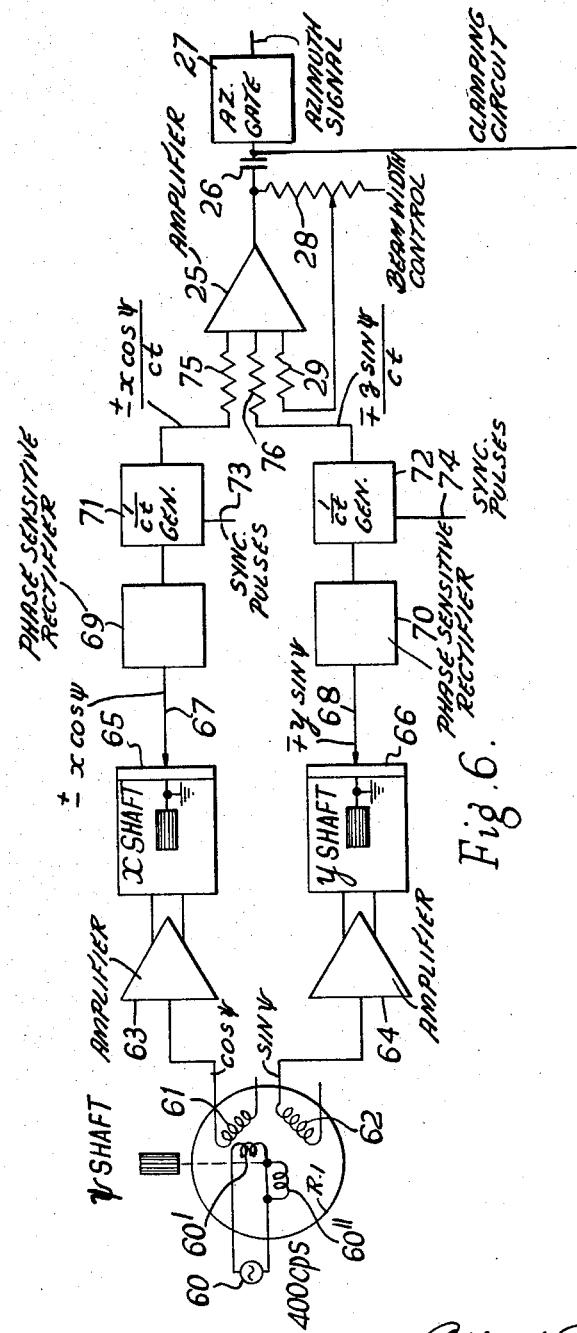
FIG. 6 is a block diagram showing an alternative method of computing in azimuth.

An alternative method of computing in azimuth is shown in FIG. 6. In FIG. 6, the shaft $\psi$ of a resolver R.1. is driven from the scanner drive of the simulator. The shaft carries rotor windings 60' and 60". The winding 60' is energised from a 400 c.p.s. source 60 and the winding 60" is short-circuited on itself. Signals corresponding to cos $\psi$ and sin $\psi$ are generated at the outputs of stator windings 61 and 62 respectively.

The cos $\psi$ and sin $\psi$ signals are fed respectively by amplifiers 63 and 64 to the windings of co-ordinate potentiometers 65 and 66 respectively driven by the $x$ shaft and the $y$ shaft respectively.

Signals obtained on lines 67 and 68 respectively from the wipers of potentiometers 65 and 66 respectively are fed to phase-sensitive rectifiers 69 and 70 respectively to provide D.C. voltages of magnitudes respectively equal to $x \cos \psi$ and $-y \sin \psi$.

These D.C. voltages are applied to clamp the initial level of two rundown voltages generated by two $$\frac{1}{ct}$$

units 71 and 72 respectively. Synchronising pulses are applied to the units 71 and 72 on lines 73 and 74 respectively.

The output voltages provided by the units 71 and 72 are fed to the input resistors 75 and 76 respectively, of the summing amplifier 25 and are used to control an azimuth gate in the manner described with reference to FIG. 3.

This method of azimuth gating has the limitation, discussed more fully below, that beamwidth is a function of range. The signal inputs applied to amplifier 25 are rundown voltages starting from the levels $x \cos$ and $y \sin$ and are not exact equivalents of the corresponding inputs to amplifier 25 in the method of azimuth computing described with reference to FIG. 3.

In apparatus where the ratio of maximum range to minimum range is small, as is generally the case for simulators for air interception exercises, this limitation is unimportant.

A modification of the apparatus of FIG. 6 is possible by feeding the 400 c.p.s. signals on lines 67 and 68 to a single phase sensitive rectifier through separate input resistors.

The single phase sensitive rectifier provides a single D.C. output voltage corresponding to the value $R \sin \delta$. This voltage is fed to a single $$\frac{1}{ct}$$

unit and thence to the input resistor 75 of summing amplifier 25.

It was mentioned above, with reference to the apparatus of FIG. 6, that simulated beamwidth is a function of range. This may be understood more clearly as follows:

By reason of the rundown voltage inputs from $$\frac{1}{ct}$$

units 71 and 72, the output of amplifier 25 is a voltage falling from a maximum value $(x \cos \psi - y \sin \psi)$. At any instant $t$ the voltage is given by the value:

$$(x \cos \psi - y \sin \psi) - f(t)$$

The azimuth gate opens when this voltage falls to a value $a$, that is $$(x \cos \psi - y \sin \psi) - f(t) = a$$

If the range gate supplies an output pulse at a time $T$, where $T$ is the scan time corresponding to a range $R$, then the range and azimuth gates are coincident when:

$$(x \cos \psi - y \sin \psi) - f(T) \leq a$$

But $$(x \cos \psi - y \sin \psi) = R \sin \delta$$

when $\delta$ is the misalignment angle.

Hence, there will be a target gate when:

$$R \sin \delta \leq a + f(T)$$

or, since $\delta$ is small, and $\sin \delta = \delta$, $$\delta \leq \frac{a + f(T)}{R}$$

Thus the beamwidth is a function of range, except when:

$$f(T) = R - a$$

What I claim is:

1. Simulating apparatus for generating simulated signals representative of signals received in echo-type object-position indicating apparatus of the kind that has a transmitter for transmitting energy in a preferred direction and a receiver for receiving reflected energy from an echo-producing object and providing an indication of the range and bearing of the said object relative to a reference location, the simulating apparatus comprising a first computing means provided with an input representative of the angle $\psi$ between the preferred angle of transmission and one axis of a pair of rectangular axes passing through the said reference location and providing outputs representative of the values $\pm \sin \psi$ and $\pm \cos \psi$, a second and a third computing means having first inputs corresponding respectively to the two rectangular coordinates $x, y$ of the said object relative to the said rectangular axes and second inputs respectively of the pair of sine values outputs and the pair of cosine values outputs of the first computing means, the outputs from the second and the third computing means being respectively representative of $\pm x \sin \psi$ and $\pm y \cos \psi$, a fourth computing means having inputs from the outputs of the second and the third computing means and providing an output representative of the range of the said object, a fifth computing means provided with a first input representative of the angle $\psi$ and a second input representative of the values $$\pm \frac{1}{ct}$$

where $t$ is the time interval between the transmission of energy and the reception of reflected energy from the said object, and $c$ is the velocity of propagation of the said energy in the object postion indicating apparatus, the said fifth computing means providing outputs representative of the values $$\frac{\pm \sin \psi}{ct} \text{ and } \frac{\pm \cos \psi}{ct}$$

a sixth and seventh computing means having first inputs corresponding respectively to the two said rectangular coordinates $x$ and $y$ of the said object and second inputs respectively from the pair of cosine valve outputs and the pair of sine value outputs of the fifth computing means, the outputs from the sixth and the seventh computing means being respectively representative of the value $$\pm \frac{x}{ct} \cos \psi \text{ and } \pm \frac{y}{ct} \sin \psi$$

and an eighth computing means having inputs from the outputs of the sixth and the seventh computing means and providing an output representative of the misalignment angle in azimuth between the said object and the said preferred direction of energy transmission.

2. Simulating apparatus according to claim 1 in which each of the fourth and the eighth computing means comprises an amplifier having the two input values supplied through summing resistors.

3. Simulating apparatus according to claim 2 in which the first computing means comprises a resolver having two stator windings and a rotor winding energized with an alternating current and rotated according to values of the angle $\psi$.

4. Simulating apparatus according to claim 3 in which the outputs of the second and the third computing means are each in the form of voltages, each of the said output voltages being rectified by a phase sensitive rectifier, and the rectified outputs being fed to two wave generators to determine the maximum amplitude of two run-down voltages which vary according to the valve $$\frac{1}{ct}$$

5. Simulating apparatus according to claim 3 in which the outputs of the second and the third computing means are each in the form of voltages, both of the output voltages being fed to a single phase-sensitive rectifier, and the rectified output being fed to a wave generator to determine the maximum amplitude of a run-down voltage which varies according to the value $$\frac{1}{ct}$$

6. Simulating apparatus for generating simulated signals representative of signals received in echo-type object-position indicating apparatus of the kind that has a transmitter for transmitting energy in a preferred direction and a receiver for receiving reflected energy from an echo-producing object and providing an indication of the range and bearing of the said object relative to a reference location, the simulating apparatus including a first computing means comprising a resolver having a stator winding and a quadrature stator winding energized with a repetitive waveform representative of the value $$\frac{1}{ct}$$

where $t$ is the time interval between the transmission of energy and the reception of reflected energy from said object, and $c$ is the velocity of propagation of the said energy, in the object position indicating apparatus, the said resolver also comprising two rotor windings rotated according to the angle $\psi$, between the preferred direction of energy transmission and one axis of a pair of rectangular axes passing through a reference location and providing outputs corresponding to the values $$\frac{\cos \psi}{ct} \text{ and } \frac{\sin \psi}{ct}$$

respectively, the said simulating apparatus further including second and third computing means having first inputs corresponding respectively to the two rectangular coordinates $x, y$, of the said object relative to the said rectangular axes, and second inputs corresponding respectively to the outputs of the said first computing means, the said second and third computing means providing outputs respectively corresponding to the values $$\frac{x}{ct} \sin \psi \text{ and } \frac{y}{ct} \cos \psi$$

a fourth computing means being provided for summing the outputs of the second and the third computing means and providing an output pulse when the sum attains a predetermined value.

7. Simulating apparatus for generating simulated signals representative of signals received in echo-type object-position indicating apparatus of the kind that has a transmitter for transmitting energy in a preferred direction and a receiver for receiving reflected energy from an echo-producing object and providing an indication of the range and bearing of the said object relative to a reference location, the simulating apparatus including computing means supplied with an electrical voltage of repetitive waveform representative of the value $1/ct$ where $t$ is the time interval between the transmission of energy and the reception of reflected energy from said object and $c$ is the velocity of propagation of the said energy, whose amplitude varies with time in each cycle of the repetitive waveform according to an inverse law, the periodicity of the waveform being the pulse repetition frequency of the said indicating apparatus, and including means producing a signal representing the reciprocal of the range of a simulated echo-type object as an instantaneous value of the $$\frac{1}{ct}$$

waveform in evaluating the terms $$\pm \frac{x \sin \psi}{ct} \text{ and } \pm \frac{y \cos \psi}{ct} \text{ or } \pm \frac{x \cos \psi}{ct} \text{ and } \pm \frac{y \sin \psi}{ct}$$

used in generating the simulated signals.

References Cited in the file of this patent
UNITED STATES PATENTS

| | | |
|---|---|---|
| 2,488,448 | Townes et al. | Nov. 15, 1949 |
| 2,555,442 | Hales | June 5, 1951 |
| 2,560,527 | Dehmel | July 10, 1951 |
| 2,677,199 | Droz | May 4, 1954 |
| 2,693,647 | Bolster | Nov. 9, 1954 |
| 2,811,789 | Paine | Nov. 5, 1957 |
| 2,841,886 | Cutler | July 8, 1958 |
| 2,924,892 | Swift | Feb. 16, 1960 |
| 2,951,297 | Colker | Sept. 6, 1960 |
| 2,955,361 | Brown | Oct. 11, 1960 |